Figure 1:
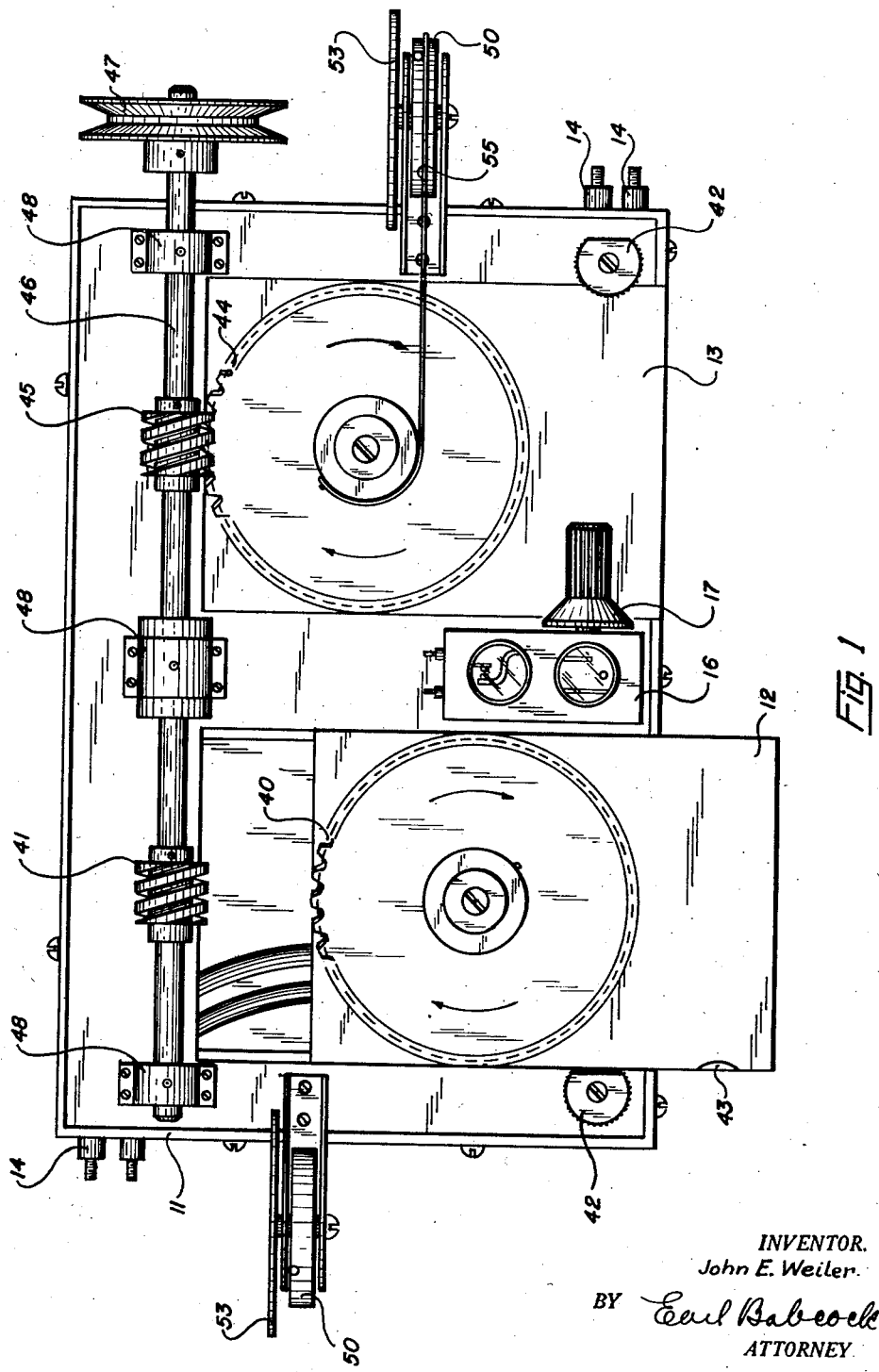

July 5, 1938.  J. E. WEILER  2,122,765
APPARATUS FOR TESTING CEMENT
Filed May 15, 1937  2 Sheets-Sheet 1

INVENTOR.
John E. Weiler.
BY Earl Babcock
ATTORNEY

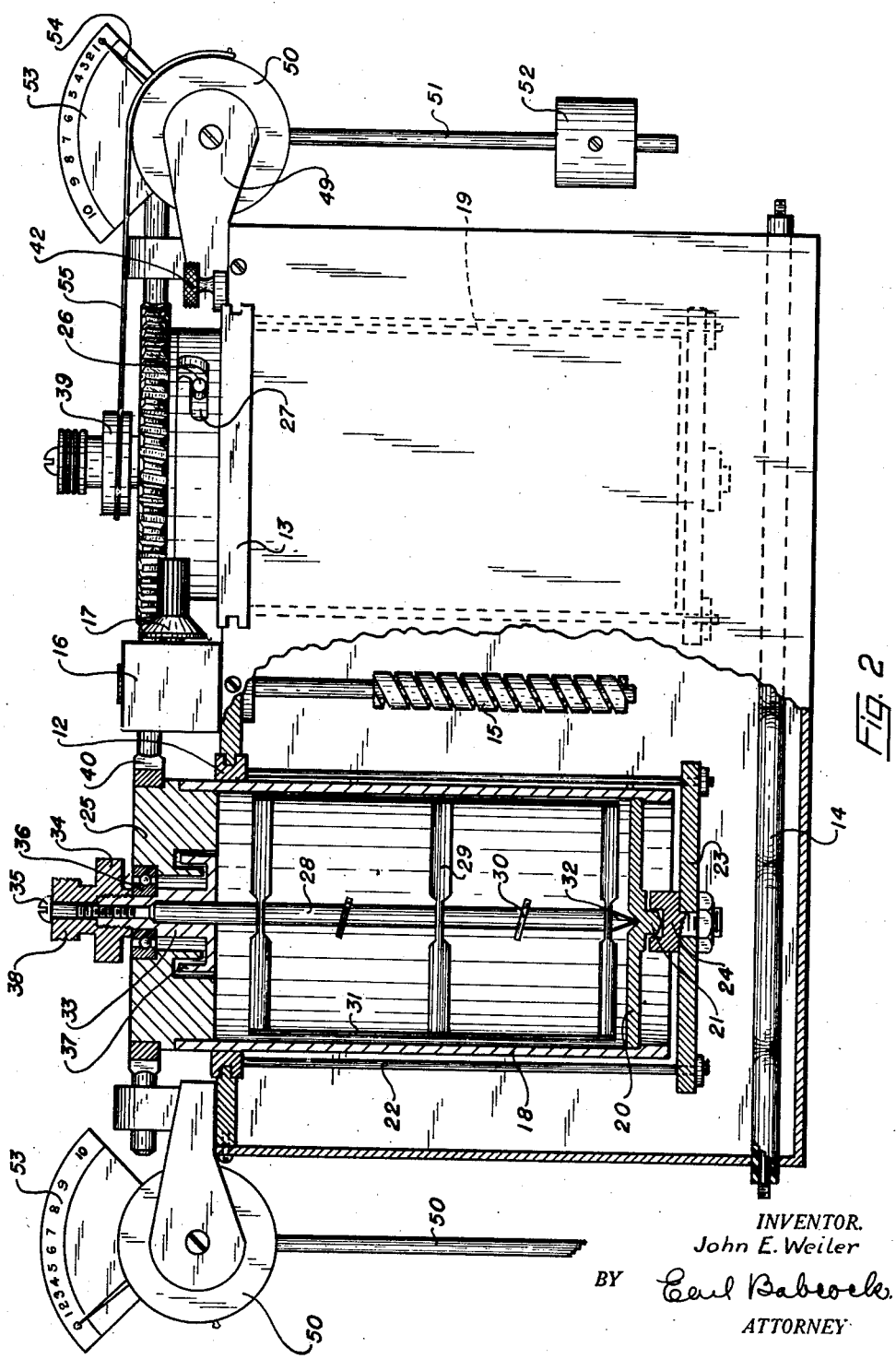

Patented July 5, 1938

2,122,765

UNITED STATES PATENT OFFICE 2,122,765

APPARATUS FOR TESTING CEMENT

John E. Weiler, Duncan, Okla., assignor to Halliburton Oil Well Cementing Company, Duncan, Okla.

Application May 15, 1937, Serial No. 142,840

1 Claim. (Cl. 265—11)

This invention relates to apparatus for testing cement or similar materials, and more particularly to an arrangement for determining the setting time of cement while subjecting the same to constant agitation.

Where cement slurry is to be placed in a distant location in a fluid condition, as in the cementing of an oil well, it is important to know how long the cement will remain in its fluid or plastic state before taking an initial set. It is also important to know how temperature conditions affect the setting time of the cement.

When a cement is mixed with water and agitated, it gradually loses its plasticity and finally reaches a state in which its form cannot be changed without rupture. The cement is then said to be "set." Long before it reaches a "set" condition, its plasticity is so low that it would be difficult or impossible to pump the same. The plasticity is dependent upon a number of factors, among which may be mentioned the chemical nature of the cement, the fineness to which it has been ground, the amount of water used in mixing, the temperature to which it is subjected, etc.

It is an object of the present invention to measure the degree of plasticity of a cement slurry while constantly agitating the same, thus simulating conditions met in pumping slurry into an oil well, where the slurry is agitated by the pumping operations.

It is a further object of the present invention to devise means for subjecting two batches of cement to the same conditions of temperature and agitation and to note and measure the plasticity of the two batches so as to make comparative tests of their suitability for use in oil well cementing or other uses where a definite knowledge of the plasticity and setting time is required.

It is a further object of the invention to devise practical and convenient apparatus for testing cement while continuously agitating the same.

Other objects and advantages reside in certain novel features of the apparatus, as will be more apparent from a consideration of the following description taken in connection with the accompanying drawings, in which:

Figure 1 is a plan view of an apparatus constructed in accordance with the present invention and adapted to be used in making comparative tests of various cements; and Figure 2 is a side view of the apparatus shown in Figure 1, parts of the apparatus being shown in cross-section to better illustrate their construction.

Referring to the drawings in detail, it will be seen that the apparatus there shown includes a suitable box or container 11 provided with two sliding panels or lids 12 and 13. Mounted within the lower portion of the box 11 is a suitable electric heater 14 which may be used to heat fluid, such as water, placed in the box. An electrical thermostat 15 may be centrally disposed within the box 11 and actuate a control switch contained within a casing 16, the switch being connected into the circuit for the heater 14 so as to regulate the temperature of the water or other fluid within the box 11. The thermostat switch element may be of any known construction and controlled by means of a dial 17 mounted on the side of the casing 16, to maintain a temperature in the box at any desired value.

In order to subject two batches of cement to the temperature prevailing within the box 11, two identical cement containers designated 18 and 19 are mounted on the panels 12 and 13, respectively. Since these containers, together with the agitating means inside, are identical, only one will be described herein in detail.

Referring to Figure 2, it will be seen that the container 18 is of general cylindrical shape. On the bottom 20 of the container is provided a suitable thrust bearing 21.

To mount the container 18 for rotation on the panel 12, tie rods or bolts 22 are connected to panel 12 and to a bottom supporting plate 23, the central portion of which has a bearing bolt 24 secured thereto, this bolt cooperating with the bearing 21 on the container 18 to support the container for rotation with respect to the panel 12. The container 18 passes upwardly through a hole in the plate 12, the hole being approximately the same diameter as the container. If desired, the hole in the panel 12 may be lined with suitable bearing material to hold the container 18 in the proper position while it rotates.

A suitable lid is provided to close the container 18. This may consist of a cylindrical block of metal 25 having a depending portion fitting into the top of the container 18. The lid 25 may be connected to the container 18 by means of a slot and pin connection, such as the pin 26 and slot 27 shown in connection with the container 19 in Figure 2.

Mounted within the container 18 and supported by the bottom plate 20 and the lid 25 thereof is an agitator consisting of a shaft 28 and agitator elements or propellers 29 and 30. The agitator elements 29 are preferably of a length approximately equal to the diameter of the container 18, while the agitator elements 30 are preferably of a lesser diameter. The outer ends of the elements 29 may be connected by means of vertically extending rods 31.

To support the agitator, the shaft 28 is provided with a pointed bearing 32 at its lower end, the point fitting into a socket in the bottom 20 of the container 18. The upper end of the shaft 28 has a collar 33 fixed thereto. This collar may be attached to the shaft by means of a nut 34 and a screw 35, the arrangement including a ball bearing 36 clamped between the nut 34 and the collar 33. The bottom portion of the collar 33 is preferably provided with a flange 37 cooperating with a recess in the lid 25 to prevent cement being tested from entering the ball bearing 36. It will be noted that the nut 34 is provided with a knurled knob or handle 38 and with a cylindrical surface 39, the purpose of which is to measure torque exerted upon the shaft 28, as will presently be described.

In using the apparatus, the container 18 is rotated and the agitator elements upon the shaft 28 are yieldingly held against rotation by torque measuring means. When slurry or other plastic material is in the container 18, and the container is rotated, some torque will be transmitted to the agitator, the amount of torque so transmitted depending upon the degree of plasticity of the material.

To rotate the container 18, the lid 25 thereof is provided with a gear wheel 40 adapted to mesh with and be driven by a worm gear 41. An advantage of the present construction resides in the fact that the panel 12 which carries the container 18, together with its lid 25 and the gear wheel 40, constitutes clutching means for driving the container 18. By merely sliding the panel 12 in the box 11 into the position shown in Figure 1, the worm 41 and the gear 40 are brought out of engagement. The container 18 may then be readily removed from the box 11. To hold the gear 40 in clutching engagement with the worm 41 a locking spool 42 is provided on the box, the spool having a flat portion on its shaft so that the panel may be moved past it when the spool is in the proper position, but providing means for cooperating with the recess 43 in the panel to lock the same in clutch engaging position.

As best shown in Figure 1, the containers 18 and 19 are both rotated by similar means. The container 19 is provided with a suitable gear 44 identical in construction with the gear 40 and is driven by a worm 45 identical with the worm 41. The two worm gears may be mounted upon a shaft 46 extending across the box 11 and provided with a pulley wheel 47 at one end so that the shaft 46 may be driven by means of a suitable electric motor (not shown), connected by a belt to the pulley 47. Any conventional motor may be employed, but it should be stated that a constant speed motor should be employed to obtain the best results.

The shaft 46 is of course provided with suitable bearings, such as are illustrated at 48, for mounting the same upon the box 11.

To yieldably hold and to indicate or measure torque exerted upon the agitators within the containers 18 and 19, two independent but identical devices are employed. Each of these holding and measuring devices may include a bracket 49 fixed to the container or box 11. A wheel 50 is mounted on a suitable bearing on the bracket 49, the wheel having a lever 51 integral therewith which lever carries an adjustable weight 52, the lever and weight acting as a pendulum. The bracket 49 may have a scale 53 fixed thereto, the scale being graduated in any arbitrary units. A pointer 54 fixed to the wheel 50 travels over this scale. The wheels 50 are connected by means of strings or other flexible connectors 55 to the cylindrical portions 39 of the nuts 34 fixed to the shafts 28 of the agitators in the respective containers. With this arrangement, it will be seen that when two different batches of cement are placed within the containers 18 and 19 and the shaft 46 rotated, both containers 18 and 19 will be turned while the agitators therein will be yieldingly held against rotation due to the weights 52. The amount the weights move will be indicative of the torque transmitted through the bodies of cement and will be indicated by the pointers 54.

The two batches of cement will be maintained in the same degree of agitation and at the same temperature, since both will be subjected to the bath within the box 11. By subjecting the two batches of cement to this constant agitation, the degree of stiffness or plasticity of the cement may be compared from time to time as the test proceeds by comparing the readings on the two scales 53, it being understood that the stiffer the cement within either of the containers, the greater will be the movement of the pointers 54 over the scales 53. The scales 53 are preferably graduated to indicate equal increments in stiffness regardless of the position of the weights 52. This makes it necessary that the space between the numerals on the scale 53 gradually increase as the pointer travels thereover, this being due to the fact that the pull required to move the weight 52 varies, depending upon the position of the weight. It will thus be seen that any two batches of cement may be compared. A standard cement may be placed in the container 18, for example, and an unknown cement in the container 19, and curves plotted from the data obtained, to show the relation of the unknown cement to the standard cement. The apparatus can, of course, also be used to test two unknown cements at the same time or to run two tests of the same cement at the same time.

While only one embodiment of the invention has been shown and described herein, it is obvious that various changes may be made in the arrangement and construction of parts without departing from the spirit of the invention or the scope of the annexed claim.

I claim:

Apparatus for testing cement or the like which includes a box having a sliding panel on the top thereof, a gear mounted on the box, a container adapted to hold cement mounted for rotation on the panel, said container having a gear thereon adapted to mesh with the gear on the box, the arrangement being such that in one position of the panel, the gears are in mesh and in another position of the panel the gears are out of mesh.

JOHN E. WEILER.